July 17, 1928.

V. BENDIX 1,677,381

BRAKE OPERATING MEANS

Filed Jan. 8, 1927

INVENTOR
VINCENT BENDIX
BY
ATTORNEY

Patented July 17, 1928.

1,677,381

UNITED STATES PATENT OFFICE.

VINCENT BENDIX, OF CHICAGO, ILLINOIS, ASSIGNOR TO BENDIX BRAKE COMPANY, OF CHICAGO, ILLINOIS, A CORPORATION OF ILLINOIS.

BRAKE-OPERATING MEANS.

Application filed January 8, 1927. Serial No. 159,807.

This invention relates to brakes, and is illustrated as embodied in novel operating mechanism for a front wheel automobile brake. An object of the invention is to provide a simplified brake-operating control for such a brake, preferably arranged so that there is a brake-applying device which can shift to center itself but which is not shifted by the brake-applying force.

In one desirable arrangement, the brake-applying device (shown as a cam and camshaft) is shiftable as described to permit the desired centering, while the operating means acts in a direction substantially perpendicular to the direction of shifting, so that it does not tend to shift the applying device.

When used on a front or other swivelled wheel, I prefer to operate the applying device by a link or similar connection which is arranged substantially perpendicular to the direction of shifting, and which is operated by means connected thereto by a joint in or immediately adjacent the swivelling axis of the wheel. This is especially effective when the applying device is arranged at one side of the brake, for shifting movement substantially paralleling the swivelling axis, and is operated by a horizontal link extending therefrom to the joint at that axis.

Another feature of the invention relates to novel operating mechanism for a front brake, including a brake-applying arm on the camshaft or its equivalent, and a generally-horizontal lever having its end in or immediately adjacent the swivelling axis of the wheel, the two being connected by a link which is preferably substantially horizontal and perpendicular both to the arm and the lever.

The above and other objects and features of the invention, including various novel combinations of parts and desirable details of construction, will be apparent from the following description of one illustrative embodiment shown in the accompanying drawing, in which.

Figure 2:
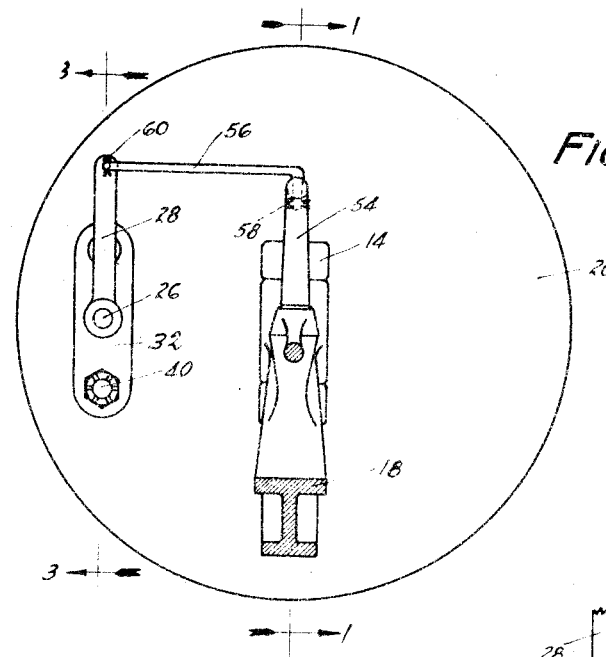
Figure 2 is a section on the line 2—2 of Figure 1, showing the brake-operating mechanism mostly in elevation.
Figure 3:
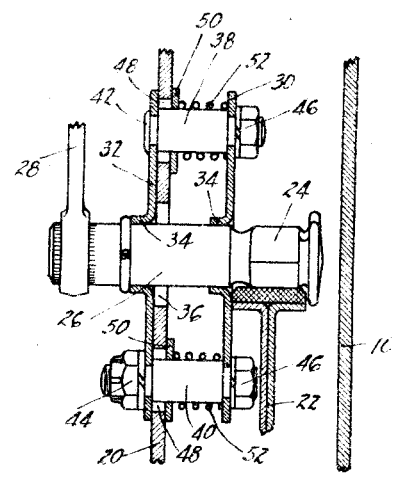
Figure 3 is a partial section on the line 3—3 of Figure 2, showing the brake-applying device and its support.
Figure 1:
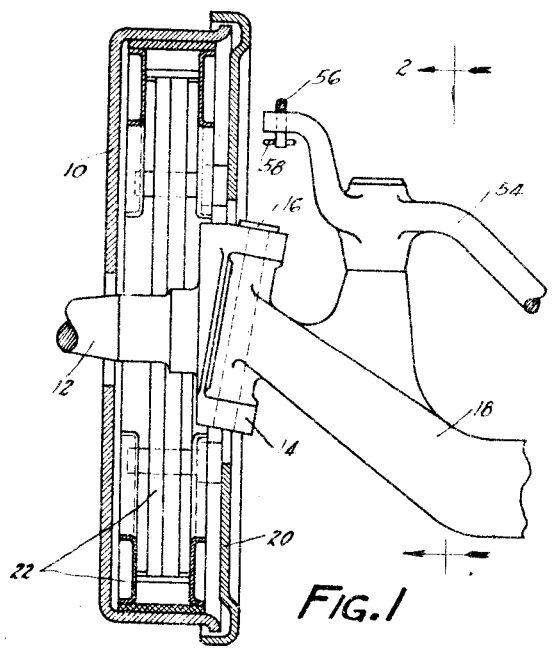
Figure 1 is a vertical transverse section through the left front brake, looking toward the front of the car.

The parts shown in Figure 1 include a brake drum 10 rotating with a wheel (not shown) on the spindle 12 of a knuckle 14 swivelled, by a king pin 16 or the like, at one end of an axle 18 supporting the usual chassis frame. At the open side of drum 10 there is a stationary support, such as a backing plate 20, carrying the shoes 22 or equivalent friction means, operated by a device shown as a double cam 24 which may be integral with a shaft 26 splined at its end to receive an operating arm 28.

The brake proper may, if desired, be substantially as more fully described in Patent No. 1,567,716, granted Bendix Brake Company on December 29, 1925, on application of A. Y. Dodge.

In order to permit cam 24 (or its equivalent) to center or balance itself with respect to the friction means, when the brake is applied, shaft 26 is supported in a manner permitting it to shift bodily in a vertical direction,—i. e. in a direction generally paralleling the swivelling axis of the wheel.

The particular shaft support shown includes two plates or stampings 30 and 32, formed with integral tubular bearings 34 for the shaft 26. Plate 32 lies along the outside of the backing plate 20, and serves to cover a relatively large opening 36 providing clearance about shaft 26 to permit the desired shifting.

Plates 30 and 32 are held spaced apart by posts or studs 38 and 40, post 38 being riveted over to form a head 42 securing it permanently to plate 32, while post 40 has a nut 44 threaded on its reduced end to secure it to plate 32. Plate 30 is secured on the posts by nuts 46, which clamp it rigidly against shoulders on the posts.

In order to permit the desired shifting of the support, as a unit with shaft 26, posts 38 and 40 pass through relatively large openings or slots 48 in the backing plate 20, which openings are in this particular arrangement concealed by plate 32. The support is frictionally held in any position to which it may shift, by plate 32 and washers 50 held against the inside of the backing plate 20 by springs 52 confined between the washers and plate 30.

It will be noted that the brake-applying device is at the rear side of the brake, and that the shifting is in a vertical direction, paralleling the swivelling axis of the wheel.

The operating means includes a generally-horizontal lever 54, fulcrumed on axle 18 or some other part which does not swivel with the wheel, for movement about an axis generally paralleling the swivelling axis of the wheel, and having its ends arranged (when the brake is applied) respectively adjacent the chassis frame and in or immediately adjacent the swivelling axis, the outer end swinging in a horizontal arc substantially intersecting the swivelling axis.

This lever 54 is connected to arm 28 by a member such as a link 56, having its front end turned vertically and projecting through an opening in the outer end of lever 54 and held by a cotter pin 58 or the like, and having its rear end turned horizontally and projecting through an opening in the end of arm 28 and held by means such as a cotter pin 60.

It will be seen that arm 28 extends upwardly in a direction parallel to the direction of shifting, and that member 56 is substantially horizontal, acting in a direction perpendicular to the direction of shifting. The brake-applying force therefore has no tendency to cause the brake-applying device to shift.

While one illustrative embodiment has been described in detail, it is not my intention to limit the scope of the invention to that particular embodiment, or otherwise than by the terms of the appended claims.

I claim:

1. Retarding mechanism for a swivelled wheel comprising, in combination, a brake swivelling with the wheel, an applying device for the brake, a support for the applying device which is shiftable in a direction paralleling the swivelling axis of the wheel to permit the applying device to center itself, and brake-operating mechanism including a joint substantially in said swivelling axis when the brake is applied, to permit swivelling of the wheel, and acting on the applying device substantially at right angles to the direction the support is shiftable, so that the application of the brake does not tend to shift the support.

2. Retarding mechanism for a swivelled wheel comprising, in combination, a brake swivelling with the wheel, an applying device for the brake, a support for the applying device which is shiftable in a direction to permit the applying device to center itself, and brake-operating mechanism including a joint substantially in said swivelling axis when the brake is applied, to permit swivelling of the wheel, and acting on the applying device in such a direction that the application of the brake does not tend to shift the support.

3. Retarding mechanism for a swivelled wheel comprising, in combination, a brake swivelling with the wheel, an applying device for the brake at one side of the brake, a support for the applying device which is shiftable in a direction paralleling the swivelling axis of the wheel to permit the applying device to center itself, and brake-operating mechanism including a part which does not swivel with the wheel and means extending from the swivelling axis to the applying device and acting on the applying device substantially at right angles to the direction the support shifts, together with a joint connecting said part and said means and which is arranged, at least when the brake is applied, substantially at the swivelling axis, to permit swivelling the wheel in steering.

4. Retarding mechanism for a swivelled wheel comprising, in combination, a brake swivelling with the wheel, an applying device for the brake at one side of the brake, a support for the applying device which is shiftable in a direction paralleling the swivelling axis of the wheel to permit the applying device to center itself, and brake-operating mechanism including a lever generally paralleling the axle and fulcrumed for movement about an axis generally paralleling the swivelling axis and a connecting member extending from the swivelling axis to the applying device and movable lengthwise to act on the applying device substantially at right angles to the direction the support shifts, together with a joint connecting said lever and said member and which is arranged, when the brake is applied, substantially at the swivelling axis, to permit swivelling the wheel in steering.

5. Retarding mechanism for a swivelled wheel comprising, in combination, a brake swivelling with the wheel, an applying device for the brake, a support for the applying device which is shiftable to permit the applying device to center itself, and brake-operating mechanism arranged to act on the applying device in a manner which does not tend to shift the support and so constructed and arranged as to permit swivelling the wheel without interference.

6. Retarding mechanism comprising, in combination, a brake, an applying device for the brake, a support for the applying device which is shiftable to permit the applying device to center itself, and brake-operating mechanism arranged to act on the applying device in a manner which does not tend to shift the support.

7. Retarding mechanism comprising, in combination, a brake, an applying device for the brake, a support for the applying device which is shiftable to permit the applying device to center itself, and brake-operating mechanism arranged to act on the applying device substantially at right angles to the direction the support shifts.

8. Brake-operating mechanism comprising, in combination, a brake-applying shaft, a support for the shaft permitting the shaft to shift when the brake is applied, to center itself, and shaft-operating means so arranged as not to cause shifting of the shaft.

9. Brake-operating mechanism comprising, in combination, a brake-applying shaft, a support for the shaft permitting the shaft to shift when the brake is applied, to center itself, and shaft-operating means acting substantially at right angles to the direction of shifting.

10. Brake-operating mechanism comprising, in combination, a brake-applying shaft, a support for the shaft permitting the shaft to shift when the brake is applied, to center itself, an operating lever on the shaft extending generally in the direction of shifting of the support, and a connection for operating the lever which extends from the lever in a direction substantially perpendicular to the direction of shifting.

11. Operating mechanism for a brake on a swivelled wheel supporting a chassis frame and comprising, in combination therewith, a brake-applying shaft at one side of the brake, an operating arm on said shaft, an operating lever fulcrumed independently of the swivelling parts and having its ends arranged, when the brake is applied, respectively adjacent said frame and substantially at the swivelling axis, and a connecting member having one end turned vertically and projecting through an opening in the end of said lever which is adjacent the brake, and having the other end turned horizontally and projecting through an opening in the end of said arm.

12. Operating mechanism for a brake on a wheel swivelled at the end of an axle comprising, in combination, a brake-applying device at the rear side of the brake including an upwardly-extending brake-applying arm, an operating lever fulcrumed independently of the swivelling parts and lying along said axle and having its end swinging toward the front of the brake in its brake-applying movement and arranged, when the brake is applied, substantially at the swivelling axis of the wheel, and a tension connection between said end of the lever and the end of said arm.

In testimony whereof, I have hereunto signed my name.

VINCENT BENDIX.